United States Patent [19]

Evers

[11] Patent Number: 4,703,661
[45] Date of Patent: Nov. 3, 1987

[54] DIFFERENTIAL PRESSURE FLOW PROBE

[75] Inventor: Ernst Evers, Grevenbroich, Fed. Rep. of Germany

[73] Assignee: Intra-Automation GmbH MESS- und Regelinstrumente, Grevenbroich, Fed. Rep. of Germany

[21] Appl. No.: 838,609

[22] Filed: Mar. 11, 1986

[30] Foreign Application Priority Data

Apr. 11, 1985 [DE] Fed. Rep. of Germany ....... 3512960

[51] Int. Cl.$^4$ .............................................. G01F 1/46
[52] U.S. Cl. .................................................. 73/861.66
[58] Field of Search ........................ 73/861.65, 861.66

[56] References Cited

U.S. PATENT DOCUMENTS 4,154,100  5/1979  Harbaugh et al. ................ 73/861.66
4,559,836 12/1985  Coleman et al. .................. 73/861.66

Primary Examiner—Herbert Goldstein
Attorney, Agent, or Firm—Shlesinger Arkwright Garvey & Fado

[57] ABSTRACT

A differential pressure flow sensor to measure the differential pressure in fluid flow in a pipe including an elongated pressure tube designed as an elongated hollow tube which is provided at its leading edge with at least one dynamic-pressure aperture and a sensor for the static pressure with at least one sensor aperture formed in the rear edge thereof. The sensor aperture being located in the wake of a body, either a separate body or a part of the hollow elongated tube, with front surfaces swept back from a forward tip and which are provided with detachment edges for the lateral detachment of the incident fluid flow without there being subsequent reattachment. In order to obtain the best test results from this differential pressure flow sensor, arcuate recesses are formed in the front surfaces at a distance from the outer limits for forming detachment edges for deflecting fluid from the planes of the front surfaces.

18 Claims, 9 Drawing Figures

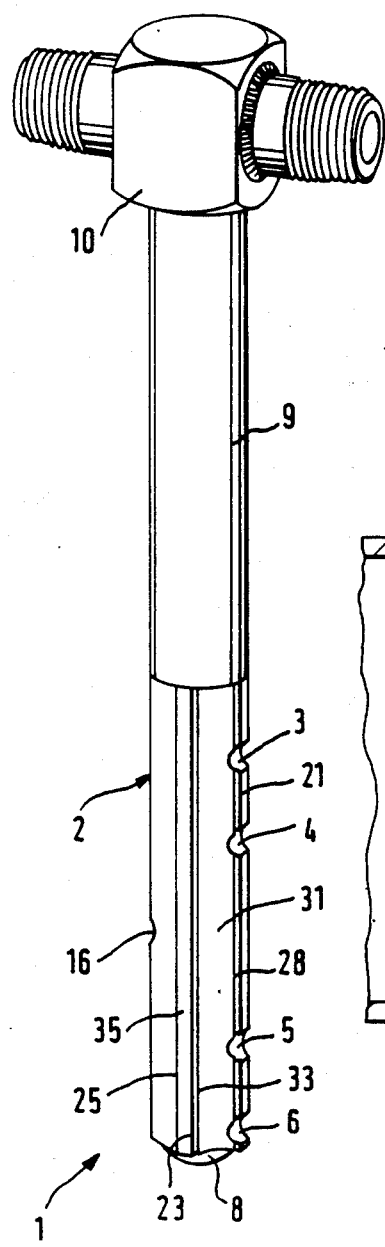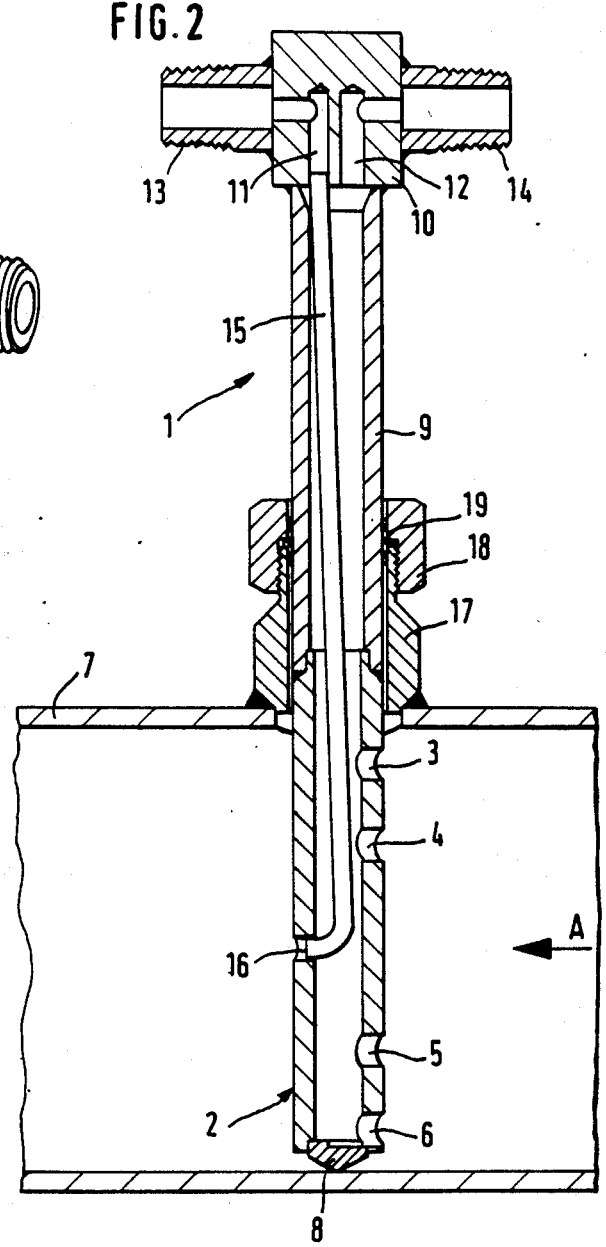

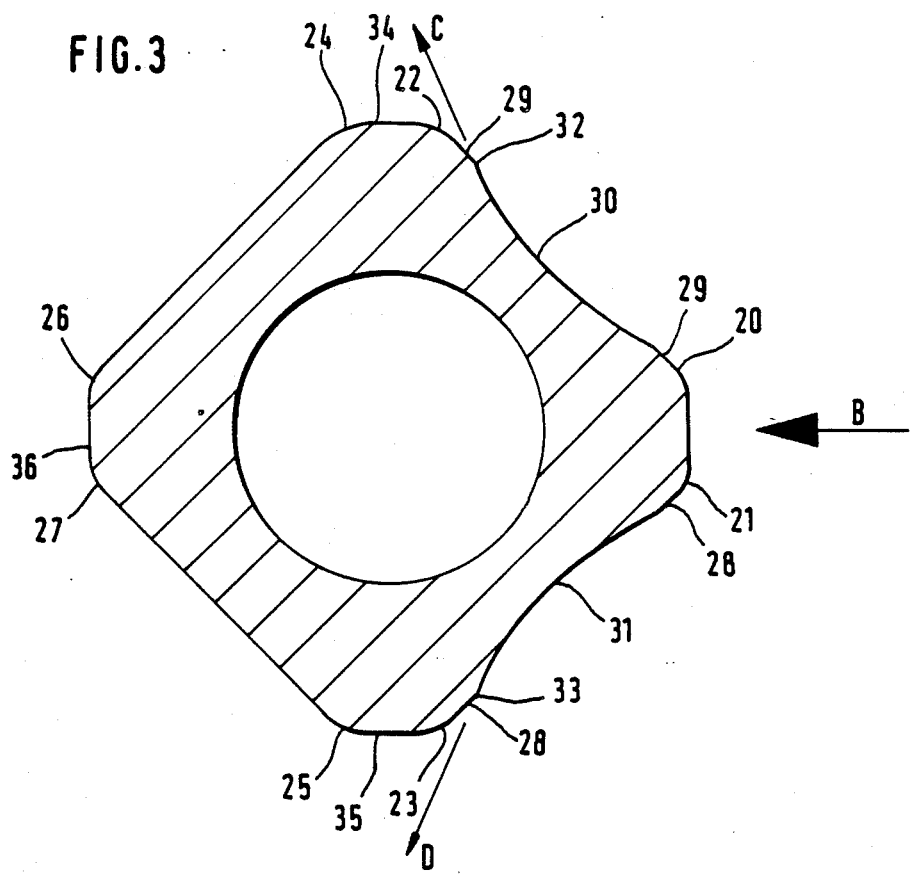

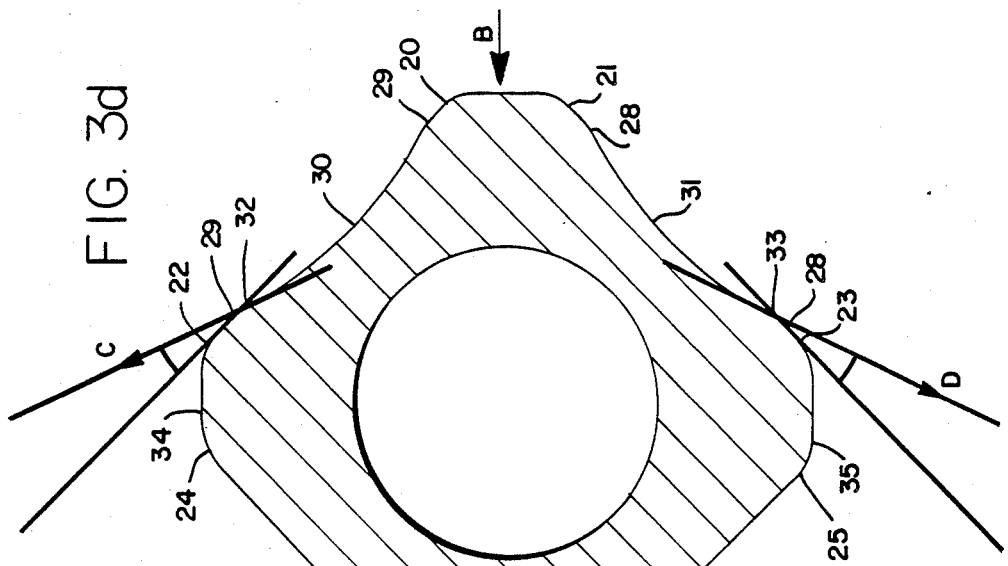
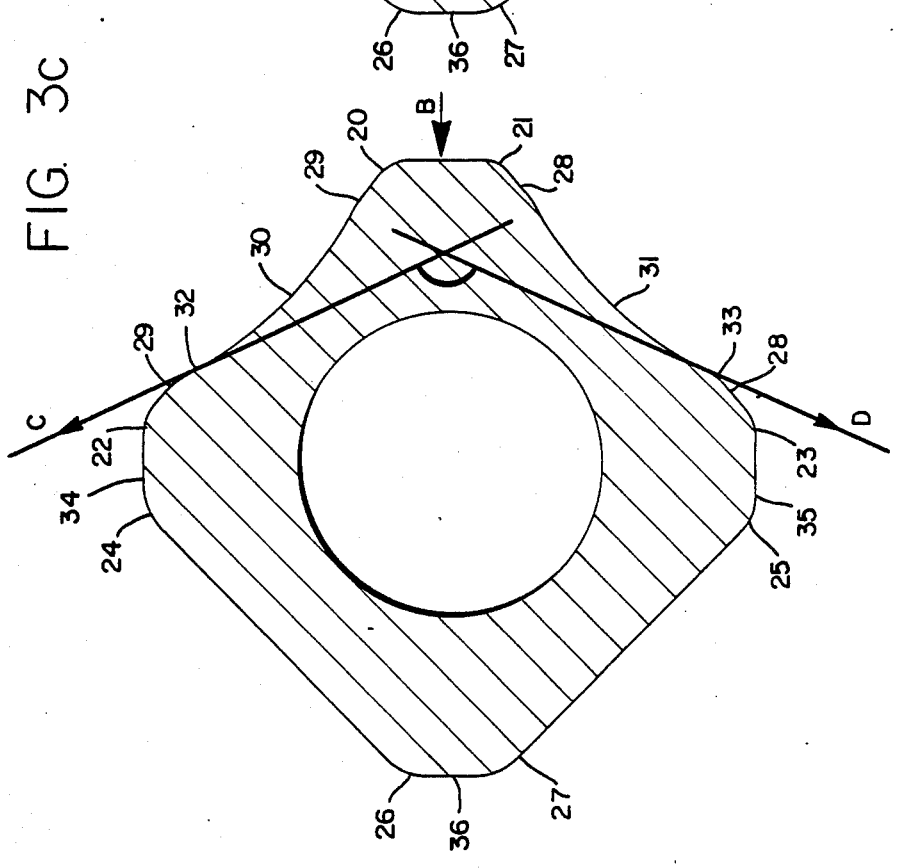

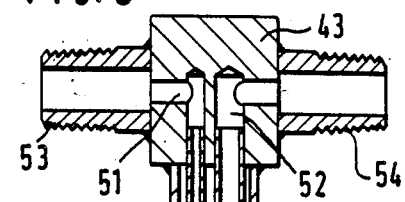
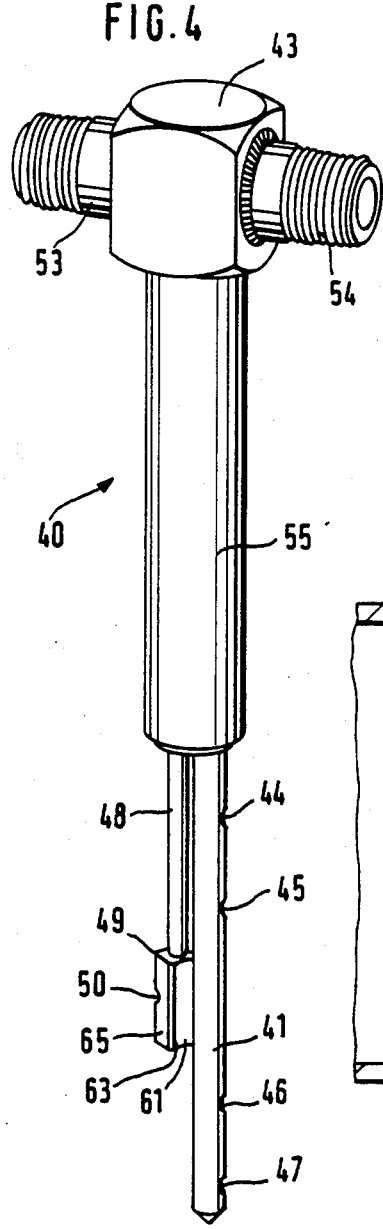
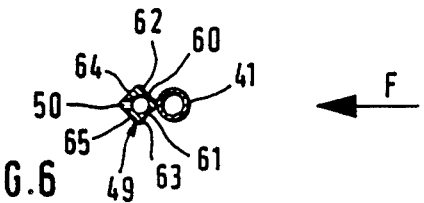

DIFFERENTIAL PRESSURE FLOW PROBE

The invention relates to a differential pressure flow probe to measure the differential pressure of a fluid flow in a pipe system, with an elongated hollow tube designed as a stagnation tube provided on its front side with at least one stagnation aperture, further including a staticpressure probe with at least one rearward probe aperture, this probe aperture being located in the wake of a body—either a separate body or part of the hollow tube—with front areas sweeping back from a front tip and including detachment edges to laterally detach the impinging fluid flow without subsequent re-attachment.

The U.S. Pat. No. 3,581,565 describes a differential pressure flow probe comprising a stagnation tube with frontside stagnation apertures symmetrically distributed over its length to sense the total pressure resulting from the addition of the static and dynamic pressures of the fluid flow. At the rear and center of the stagnation tube there is a downstream-pointing probe aperture to detect the static pressure. The stagnation tube and the probe aperture are connected by tubes to a measuring device forming a difference of the two detected pressure values and thus ascertaining the dynamic pressure in the fluid flow. This dynamic pressure is known to be proportional to the square of the speed of the fluid and hence to flow rate through the pipe.

Placing the probe aperture which detects the static pressure downstream of the stagnation tube offers the advantage that this probe aperture is in the wake of the stagnation tube and hence in a region where the static pressure is substantially lower than the pressure of free flow. The displayed differential pressure then is larger; this is desirable for a more accurate display.

The cross-section of the above-described differential-pressure flow probe is circular. The drawbacks of such a design are comprehensively discussed in the German Offenlegungsschrift No. 28 42 676. Essentially they are that the flow detachment occurs as a function of the flow rate at different places at the outer surface of the stagnation tube with circular cross-section.

This phenomenon already has been known since the turn of the century. As a result, the flow drag of the stagnation tube varies as a function of the speed of the flow. In turn this results in a non-linear relationship between the pressure difference and the square of the speed or flow and hence there are errors in the measured values.

The German Offenlegungsschrift No. 28 42 676 palliates these difficulties by suggesting to design the stagnation probe, or a body containing the probe aperture in a variety of ways. All these designs share in common that the outer boundaries of the front surfaces of the stagnation tube (FIGS. 1 through 6) or of the additional body (FIGS. 7 through 9) always terminate in an edge which is so sharp that the flow boundary layer impinging on the front surfaces and resting against them will detach from them. The lateral and rearward surfaces are designed in such a way that following detachment the flow no longer will come to rest on them, whereby—at least in theory—flow detachment always occurs at the same place independently of the speed of the flow.

On one hand the proposed cross-sectional shapes are triangles with the front side transverse to the direction of flow. This is a disadvantageous design because the flow division is inaccurate and unstable and because the inside available space of the tubes is relatively slight. To that extent substantially square cross-sections such as shown in FIGS. 1, 3, 4 and 6 of the German Offenlegungsschrift No. 28 42 676 are more advantageous. In the installed condition they are arranged in such a manner that one of the diagonals is parallel to the tube center axis, whereby the impinging fluid flow is neatly divided from the front surfaces flaring in arrow form.

Casual mention is made at the bottom of page 12 and at the top of page 13 of the German Offenlegungsschrift No. 28 42 676 of impinging surfaces which are concave, divergent, curved upstream-directed. However, specifics are lacking what these individual surfaces look like, and most importantly how they are to be aligned with respect to the incident flow. Moreover they are dismissed with the observation of offering no advantages over plane surfaces and furthermore requiring complex manufacture, i.e. that on the whole they are disadvantageous compared to the cross-sectional shapes shown in the drawings.

The cross-sectional contour shown in FIGS. 1 and 4 of the German Offenlegungsschrift No. 28 42 676 was found especially advantageous as regards manufacturing. This dynamic-pressure tube contour differs from a rigorously square one in that the longitudinal edges are so much chamfered that two parallel side surfaces and parallel front and rear surfaces are formed, whereby the original square contour, as shown in FIGS. 3 and 6 of the German Offenlegungsschrift No. 28 42 676, becomes an octagon. Such a cross-section is easily manufactured by drawing or punching. Milling work thereafter is only required in drilling the stagnation and probe apertures.

However such manufacturing methods do not permit making the longitudinal edges of the stagnation tube sharp enough to make the flow impinging on the swept-back front surfaces detach always at the same place in the area of the outer edges of these front surfaces. Accordingly, no precise proportionality can be achieved between the pressure difference and the square of the flow rate, i.e. the correction factor for the drag value fluctuates with the speed of flow. Attempts have been made to palliate this difficulty by finishing by milling to sharpen the edges. Still the results are not satisfactory as yet.

The object of the invention is to so further develop a differential pressure flow probe of the initially cited kind that in spite of a relatively simple and economical manufacture, it offers very good measured values. This problem is solved by the invention in that arcuate and outwardly deflecting recesses are formed in the front surfaces at a distance from the outer and also from the front tip, the outer edges of these recesses being designed to be the detaching edges.

This design is based on the insight part of the invention that the swept-back front surface for the neat division of the fluid flow and for low drag values are advantageous in these regards but not as concerns the formation of detachment edges at their outer boundaries, especially where the stagnation tube is economically produced by a drawing process. By means of the additionally formed arcuate recesses, the fluid flow impinging on the front surfaces now is deflected outwardly more than the sweepback angle of the front surfaces, and thereby is achieved a neat flow detachment from the outer edges of the recesses. The constant change in direction within the recesses prevents premature detachment and manifestly imparts so strong an outward spin to the flow that, as shown empirically, no draw-back is incurred if the front surfaces continue somewhat beyond their junction to the outer edges of the recesses. The flow does not re-attach.

The shaping of such recesses however was faced with the difficulty that the material cross-section of the contour is very slight precisely in this area while such probes are being stressed more than trivially in particular when being used in pipes with large inside diameters. The invention accounts for such a difficulty in that in its design the recesses do not extend across the entire front surfaces but are kept so small that the reduction in the material cross-section and hence the loss of strength is kept within narrow limits and can be compensated by other steps without residual problems. Surprisingly, in the light of the discussions to the contrary found in the German Offenlegungsschrift No. 28 42 676, such limitations do not cause any drawbacks. Manifestly the spin imparted by the recesses is so strong—as already explained above—that a continuation of the front surfaces joining the outer edges of the recesses is harmless.

One of the special advantages deriving from these steps is that this shape of the front sides can be manufactured in problem-free manner by a draw process requiring no finishing. The limited edge sharpness so obtained manifestly is compensated to such an extent by the spin imparted by the arcuate shape of the recesses that detachment always occurs at the same place, whereby a constant correction factor is achieved over a very wide range of speeds. Accordingly, the accuracy of measurement is improved by the invention.

The behavior of the differential-pressure flow probe of the invention is expecially unexpected and therefore surprising in two further regards. It is known that very low frequency fluctuations of measurement results about the actual value of the pressure difference are characteristic of such probes. As a result the read-out of the proper value of pressure difference is significantly impeded. Measurements performed by the differential-pressure flow probe of the invention showed a much reduced fluctuation of such test values and hence a correspondingly improved accuracy of read-out. A further surprise was that the pressure difference is appreciably increased, especially at slight pipe diameters, whereby again the read-out accuracy is improved. Manifestly the deflection is so amplified by the recesses that the static pressure in the downstream region is especially low compared to free flow.

Therefore, on the whole, a shape has been found for the differential pressure flow probe, which inspite of simple and therefore more economical manufacture is characterized by improved measurement accuracy.

Care must be paid when actually shaping and arranging the recesses within the front surfaces that these recesses line up with the inner edges in the most advantageous manner as regards flow conditions and that they so end at the outer edges that an outward spin relative to the front surfaces is imparted to the flow which thereby no longer can re-attach to these surfaces. The advantageous values below were ascertained from experiment.

In manner known per se, the front surfaces should subtend an angle of about 90° as seen in FIG. 3a. On one hand advantageous cross-sections of material to shape the recesses are available thereby, and on the other hand the detachment edges can be made sharp.

The tangents to the inner edges of the recesses should be at angles from 0° to 60° as illustrated in FIG. 3b.

Angles between at least 20° and at most 40° were found especially advantageous.

A range from 100° to 180° as best seen in FIG. 3c is preferred for the tangents to the outer edges of the recesses. Angles between at least 130° and at most 160° were found especially suitable. The angle between the tangents to the outer edges of the recesses and the particular adjoining front-surface areas should be at least 20° as illustrated in FIG. 3d. This angle should be the larger the further the front surface join the outer edges of the recesses continues.

A further design of the invention provides that the recesses always extend across approximately 60 to 80% of the sweptack segments of the front surfaces.

Lastly, the body of the invention comprising the probe aperture(s) consists of a punched or drawn segment.

The invention is shown in further detail in the drawings in relation to two illustrative embodiments:

FIG. 1 is an elevation of a differential pressure flow probe.

FIG. 2 is the differential pressure flow probe of FIG. 1 shown in longitudinal section through a pipe segment.

Figure 3A:
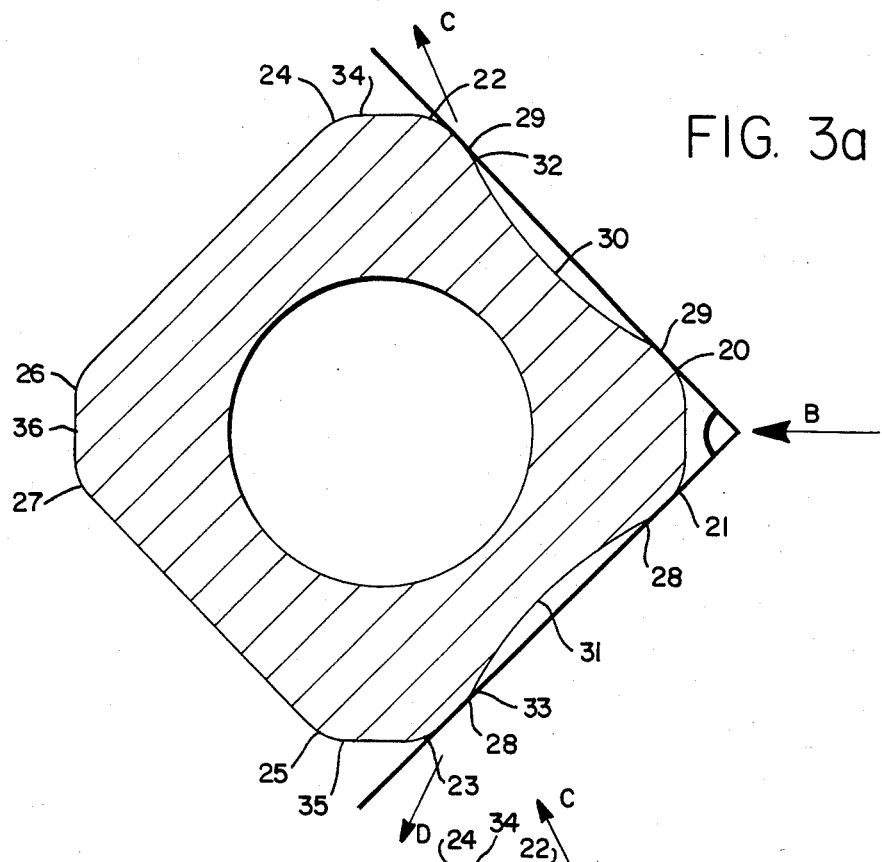
FIG. 3 is a cross-section of the stagnation tube of the differential pressure flow probe of FIGS. 1 and 2.
Figure 3B:
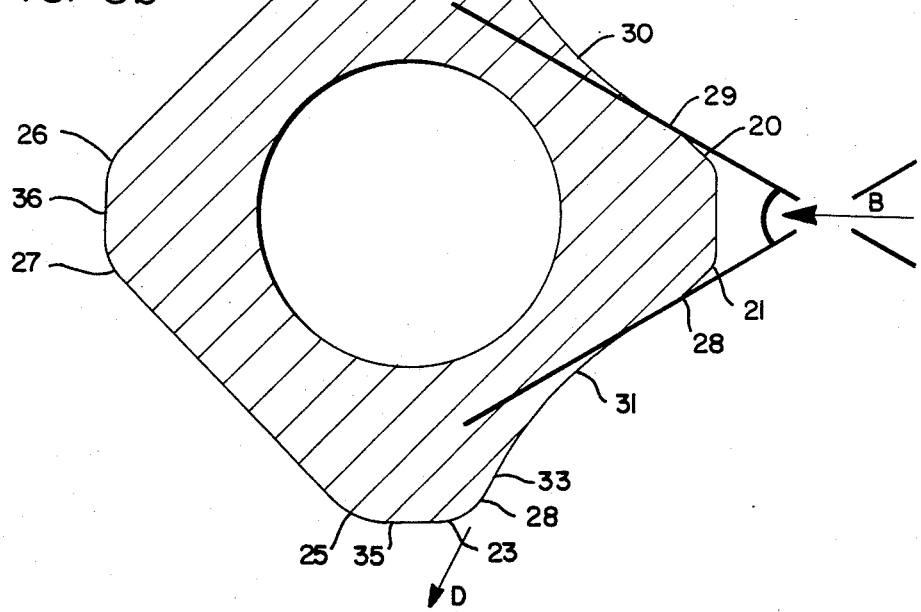

FIGS. 3a–d are cross-sectional of the stagnation tube of the differential pressure flow probe of FIGS. 1 and 2 further illustrating various angular relationships.

FIG. 4 is another differential pressure flow probe.

FIG. 5 is the differential pressure flow probe of FIG. 4 shown as a longitudinal section through a pipe segment.

FIG. 6 is a cross-section of the stagnation tube of the differential pressure flow probe of FIGS. 4 and 5.

The differential pressure flow probe 1 shown in FIGS. 1 and 2 includes a stagnation tube 2 which is provided on one side with four dynamic pressure apertures 3, 4, 5 and 6. When, as shown in FIG. 2, the differential pressure flow probe 1 is installed in a pipe segment 7, the dynamic pressure apertures 3, 4, 5 and 6 are symmetric with the center pipe axis and point toward the fluid flow as indicated by the arrow A.

The lower end of the stagnation tube 2 as seen in this Figure is sealed by a cap 8. This cap 8 rests by tip against the inside wall of the pipe segment 7. A connecting stub 9 is coaxially welded to the upper and open end of the stagnation tube 2. This stub is sealed at the top by a top piece 10 through which pass two connection bores 11, 12 issuing resp. into a laterally extending threaded nipple 13 and 14. A device for measuring the pressure difference may be hooked up to these threaded nipples 13 and 14.

The connection bore 11 shown on the left in this Figure communicates by a tube 15 which passes through the connecting stub 9 as far as the middle of the stagnation tube with a probe aperture 16 on the rear side of the stagnation tube 2 in such a manner that the probe aperture 16 is without communication to the inside of the stagnation tube 2. Accordingly, the static pressure of the fluid flow is sensed through this probe aperture 16, while within the stagnation tube 2 and the pipe segment 7 the dynamic pressure of the fluid flow is prevailing. The difference between the two pressure values then is proportional to the square of the flow rate.

The differential pressure flow probe 1 is mounted within a pipe stub 17 welded to the pipe segment 7. A cap screw 18 is screwed onto the pipe stub 17 and in the process so tightens a sealing ring 19 that simultaneously thereby the differential pressure flow probe 1 is fixed in place.

The inventive feature of the differential pressure flow probe 1 is shown in particular in FIG. 3. The stagnation tube 2 shown cross-sectionally therein is manufactured from a basically octagonal pipe segment is that eight corresponding longitudinal edges 20, 21, 22, 23, 24, 25, 26 and 27 are formed. As this pipe segment was formed by drawing, these longitudinal edges 20 through 27 are less than sharp, rather they are rounded off. No clean flow detachment could be achieved thereby in the region of the outer longitudinal edges 22, 23 of the front surfaces 28, 29.

To achieve such detachment nevertheless, arcuate recesses 30, 31 have been shaped into the front surfaces 28, 29 in such a manner that the outer boundaries of the recesses 30, 31 are designed as detachment edges 32, 33. The recesses 30, 31 act like buckets and outwardly deflect the fluid flow incident on the stagnation tube 2 and indicated by the arrow B, in a sharp manner and without the possibility of premature detachment, whereby the fluid flow detaches at the detaching edges 32, 33 in the direction of the arrows C and D, and therefore detaches neatly. It was found that the deflection is so pronounced that the front surfaces 28, 29 where adjoining the detachment edges 32, 33 may go on in flaring manner until merging into the parallel side surfaces 34, 35 that no ill effect is incurred thereby. The cross-section of the stagnation tube 2 constricts beyond the side surfaces 34, 35 as far as a rear surface 36 which includes a probe aperture 16 (omitted from this Figure). Accordingly, the dynamic pressure apertures 3, 4, 5 and 6—also omitted —are on the opposite side of the stagnation tube 2, pointing opposite the arrow B.

The differential pressure flow probe shown in FIGS. 4 and 5 is provided with a stagnation tube 41 extending between top and bottom and of which the lower end rests against the inside wall of a pipe segment 42, its upper end issuing in a top part 43. The stagnation tube 41 furthermore includes a total of four dynamic pressue apertures 44, 45, 46 and 47 arranged pairwise and symmetrically to the longitudinal axis of the pipe segment 42 for the installed condition of the differential pressure flow probe 40 in the pipe segment 42 as shown in FIG. 5.

A probe tube 48 starts at the top part 43 and issues into a probe body 49 where it communicates with a probe aperture 50 directed downstream. The probe body 49 is welded by its front side to the rear of the stagnation tube 41.

Two connection bores 51, 52 pass through the top part 43 and issue each into a laterally extending threaded nipple 53 and 54. A measuring device to sense the pressure difference can be hooked up to these threaded nipples 53, 54. Below the top piece 43 and as far as somewhat above the pipe segment 42 the stagnation tube 41 and the probe tube 48 are enclosed by a sheath pipe 55 of which the lower end is sealed by a welded-on plate 56.

The differential pressure flow probe 40 together with the sheath pipe 55 is mounted within a pipe stub 57 welded to the pipe segment 42. A screw-cap 58 is screwed on the pipe stub 57 and thereby tightens a sealing ring 59 in such a manner that thereby the differential pressure flow probe 40 will be fixed in place.

The characteristic of the differential pressure flow probe 40 of the invention is shown particularly clearly in FIG. 6. This Figure shows a cross-section of the stagnation tube 41 and the probe body 49 between the lower end of the probe tube 48 and the probe aperture 50. The probe body 49 comprises at its front side one arcuate recess 60, 61 each in such a manner that the outer boundaries of the recesses 60, 61 form detachment edges 62, 63. The recesses 60, 61 act like buckets and deflect outward the fluid flow incident on the probe body 49 in such a manner that the fluid flow moves away from the detaching edges 62, 63 and in the process detaches neatly. It was found that the deflection is so pronounced that whether or not the front surfaces adjoining the detaching edges 62, 63—not clearly visible here—extend further in widening manner until merging into parallel side surfaces, no effect is felt. The rear surfaces 64, 65 converge acutely toward the rear and are shaped into the probe aperture.

I claim:

1. A differential pressure flow probe for measuring the difference in the fluid flow in a pipe system, comprising:
   (a) a hollow elongated stagnation tube,
   (b) said stagnation tube including leading and trailing faces,
   (c) said leading face having at least one dynamic-pressure aperture formed therein,
   (d) a probe for sensing static pressure,
   (e) said probe being secured to said hollow stagnation tube adjacent said trailing face,
   (f) said probe including front and rear faces,
   (g) said probe having an aperture formed in said rear face, said probe including front surfaces extending angularly from opposing ends of said front face such that said front surfaces intersect the line of flow of fluid in the pipe,
   (h) said front surfaces of said probe including a concave recess formed therein for directing fluid from the planes of said front surfaces, and
   (i) said front surfaces of said probe further include a substantially planar surface extending from one end of said concave recess, whereby the intersection of said substantially planar surface and said concave recess forms a detachment edge for providing lateral detachment of the incident fluid flow without there being subsequent reattachment.

2. A differential pressure flow probe as in claim 1, wherein:
   (a) tangents to inner edges of said concave recesses subtend an angle of at most 40°.

3. A differential pressure flow probe as in claim 2, wherein:
   (a) tangents to inner edges of said concave recesses subtend an angle of at least 20°.

4. A differential pressure flow probe as in claim 1, wherein:
   (a) the angle between tangents to outer edges of said concave recesses and said substantially planar surfaces extending therefrom is at least 20°.

5. A differential pressure flow probe as in claim 1, wherein:
   (a) said concave recesses each extend across approximately 60 to 80% of said front surfaces.

6. A differential pressure flow probe as in claim 1, wherein:
   (a) said hollow elongated stagnation tube includes a punched or drawn segment.

7. A differential pressure flow probe as in claim 1, wherein:

(a) said front surfaces subtend a sweep back angle of approximately 90°.

8. A differential pressure flow probe as in claim 1, wherein:
   (a) the tangents to inner edges of said concave recesses subtend an angle from zero to 60°.

9. A differential pressure flow probe as in claim 1, wherein:
   (a) tangents to outer edges of said concave recesses subtend an anle from 100° to 180°.

10. A differential pressure flow probe as in claim 9, wherein:
    (a) tangents to outer edges of said concave recesses subtend angle of at least 130°.

11. A differential pressure flow probe as in claim 9, wherein:
    (a) tangents to outer edges of said concave recesses subtend an angle of at most 160°.

12. A differential pressure flow probe for measuring the difference in fluid flow in a pipe system, comprising:
    (a) a hollow elongated stagnation tube,
    (b) said stagnation tube including leading and trailing faces,
    (c) said leading face having at least one dynamic-pressure aperture formed therein,
    (d) a probe for securing static pressure,
    (e) said trailing face having a probe aperture formed therein,
    (f) said probe being disposed in said hollow stagnation tube for communicating with said probe aperture,
    (g) said stagnation tube including front surfaces extending angularly from opposing ends of said leading face such that said front surfaces intersect the line of flow of fluid in the pipe,
    (h) said front surfaces include a concave recess formed therein for directing the fluid from the planes of said front surfaces, and
    (i) said front surfaces include a substantially planar surface extending from one end of said concave recess whereby the intersection of said substantially planar suface and said concave recess forms a detachment edge for providing lateral detachment of the incident fluid flow without there being subsequent reattachment.

13. A differential pressure flow probe as in claim 12, wherein:
    (a) said probe includes a punched or drawn segment.

14. A differential pressure flow probe as in claim 12, wherein:
    (a) said front surfaces subtend a sweep back angle of approximately 90°.

15. A differential pressure flow probe as in claim 12, wherein:
    (a) tangents to inner edges of said concave recesses subtend an angle from zero to 60°.

16. A differential pressure flow probe as in claim 12, wherein:
    (a) tangents to outer edges of said concave recesses subtend an angle from 100° to 180°.

17. A differential pressure flow probe as in claim 12, wherein:
    (a) tangents to outer edges of said concave recesses and said substantially planar surfaces extending therefrom is at least 20°.

18. A differential pressure flow probe as in claim 12, wherein:
    (a) said concave recesses each extend across approximately 60 to 80% of said front surfaces.

* * * * *